Aug. 11, 1925.  
L. L. JOHNSON  
TIRE CORE  
Filed Nov. 12, 1923  
1,549,668

INVENTOR.  
Lawrence L. Johnson,  
BY  
Robt. D. Pearson  
ATTORNEY.

Patented Aug. 11, 1925.

1,549,668

UNITED STATES PATENT OFFICE.

LAWRENCE L. JOHNSON, OF LOS ANGELES, CALIFORNIA.

TIRE CORE.

Application filed November 12, 1923. Serial No. 674,212.

*To all whom it may concern:*

Be it known that I, LAWRENCE L. JOHNSON, a subject of the King of Sweden, residing at Los Angeles, in the county of Los Angeles and State of California, have invented certain new and useful Improvements in Tire Cores, of which the following is a specification.

My invention relates to vehicle wheels, and the objects are, first, to provide a solid tire that may be assembled into an outer tire casing; second, to provide interlocking fillers for an outer tire casing; and, third, to provide a tire rim that will clamp the said casing and fillers together and be mounted on a wheel felly in the customary manner.

Other objects and advantages will be made manifest in the following specification with an embodiment of the invention illustrated in the accompanying drawings.

The invention consists of the arrangement of parts an embodiment of which invention is also illustrated in the accompanying drawings, in which.

Figure 1:
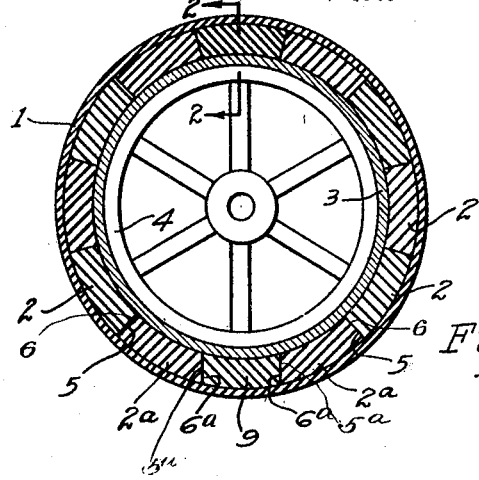
Figure 1 represents a sectional view of the tire and rim on line 1—1 of Figure 2.
Figure 2:
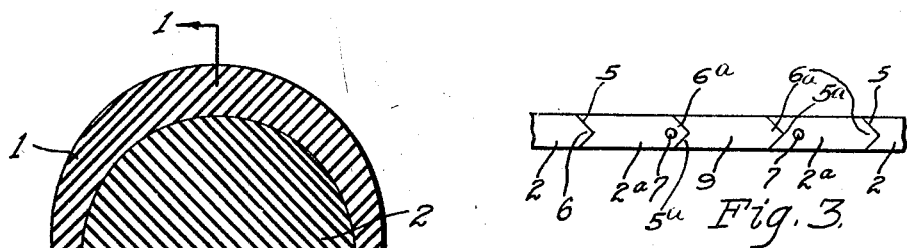
Figure 2 represents a sectional view of the wheel on line 2—2 of Figure 1.
Figure 3:
Figure 3 represents a developed inner circumferential view of the interlocking fillers.
Figure 4:
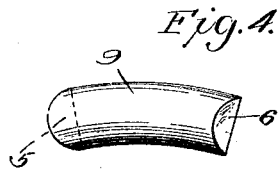
Figure 4 represents a side elevation of one of the fillers.

Referring to the drawing in which like characters of reference designate similar parts, the casing 1 being of an elastic material, is positioned on a circumferentially split rim 3—3ª, which rim is mounted on a felly 4. Fillers 2, 2ª and 9 are placed circumferentially end-to-end within said casing, there being only two fillers 2ª which are placed between the two end fillers 2, and only one filler 9 which is placed between the fillers 2ª. In one end of each of the fillers 2 and 2ª is formed a V-shaped groove 5, extending radially to the center of the wheel, and on the other end of each filler is formed a corresponding tongue 6, which tongues respectively fit in the grooves 5 of the adjacent fillers, as shown in Figure 3. A recess 7, as shown in Figure 3, is provided in the inner side of each of the fillers 2ª to receive a spreader tool, not shown. The adjoining ends of the fillers 2ª and 9 are also formed with V-shaped tongues 6ª and grooves 5ª, which tongues and grooves being opposite one another on the two ends of the filler 9 are positioned parallel to one another as shown in Figure 1.

The said fillers 2 and 2ª are first laid into the casing 1 with the tongues 6 and grooves 5 locked together as shown in Figure 3, and are pressed together by inserting a suitable spreader tool in the recesses 7, to leave a suitable opening between the tongues 6ª and grooves 5ª to receive the filler 9, and the tongues 6ª and grooves 5ª being parallel to one another as hereinbefore described, the said filler 9 may be inserted between the adjoining fillers 2ª within the casing 1, and when the said spreader tool is removed from the recesses 7 the fillers 2 and 2ª and 9 are permitted to expand and thus close the said tongue 6ª and groove 5ª together also as shown in Figure 3. The assembled casing 1 and fillers 2, 2ª and 9 are clamped together by pressing the joints 8 together in the rims 3 and 3ª, and the rims 3—3ª are in turn mounted on the felly 4 in the customary manner.

Having thus described my invention what I claim is:

In a vehicle wheel, a casing split around its circumference, a plurality of fillers in said casing, two of said fillers respectively at the ends of an intermediate filler having sockets to receive a spreader tool.

In testimony whereof I affix my signature.

LAWRENCE L. JOHNSON.